(12) United States Patent
Casey et al.

(10) Patent No.: US 7,441,623 B2
(45) Date of Patent: Oct. 28, 2008

(54) MULTI-MOTOR DRIVE SYSTEM FOR A WORK MACHINE

(75) Inventors: Kent A. Casey, Washington, IL (US); Rodger L. Moring, Bristol, IL (US)

(73) Assignee: Caterpillar Inc., Peoria, IL (US)

( * ) Notice: Subject to any disclaimer, the term of this patent is extended or adjusted under 35 U.S.C. 154(b) by 426 days.

(21) Appl. No.: 11/066,273

(22) Filed: Feb. 28, 2005

(65) Prior Publication Data

US 2006/0191168 A1    Aug. 31, 2006

(51) Int. Cl.
*B60K 17/356* (2006.01)
(52) U.S. Cl. .................... 180/243; 180/235
(58) Field of Classification Search ........... 180/235, 180/248, 245, 243; 475/224
See application file for complete search history.

(56) References Cited

U.S. PATENT DOCUMENTS

| | | | |
|---|---|---|---|
| 4,102,131 A | 7/1978 | Reynolds et al. |
| 4,232,572 A | 11/1980 | Ross et al. |
| 4,353,272 A | 10/1982 | Schneider et al. |
| 4,434,680 A | 3/1984 | Riediger et al. |
| 4,519,275 A | 5/1985 | Maruyama et al. |
| 4,658,927 A | 4/1987 | Kanazawa |
| 4,702,358 A | 10/1987 | Mueller et al. |
| 4,767,382 A | 8/1988 | Tezuka et al. |
| 4,998,591 A | 3/1991 | Zaunberger |
| 5,101,919 A | 4/1992 | Ossi |
| 5,195,600 A | 3/1993 | Dorgan |
| 5,307,888 A | 5/1994 | Urvoy |
| 5,363,937 A | 11/1994 | James |
| 5,388,658 A | 2/1995 | Ando et al. |
| 5,415,596 A | 5/1995 | Zulu |
| 5,445,234 A | 8/1995 | Hall, III |
| 5,477,454 A | 12/1995 | Ishino et al. |
| 5,477,455 A | 12/1995 | Ishino et al. |
| 5,509,491 A | 4/1996 | Hall, III |
| 5,525,043 A | 6/1996 | Lukich |

(Continued)

FOREIGN PATENT DOCUMENTS

| | | |
|---|---|---|
| EP | 1008481 | 6/2000 |
| FR | 2658259 | 8/1991 |
| WO | WO 94/09548 | 4/1994 |
| WO | WO 03/093046 | 11/2003 |

*Primary Examiner*—Tony H. Winner
(74) *Attorney, Agent, or Firm*—Finnegan, Henderson, Farabow, Garrett & Dunner.

(57) ABSTRACT

A multi-motor drive system for a work machine has a first traction device and a second traction device substantially aligned transversely of a primary travel-direction of the work machine. The drive system also has a first drive-group power-transfer system that connects the first traction device and the second traction device. The drive system may also include a third traction device and a fourth traction device substantially aligned transversely of the primary travel-direction of the work machine. Further, the drive system also includes a second drive-group power-transfer system that connects the third traction device and the fourth traction device. Additionally, the drive system has an inter-group power-transfer system that connects the first drive-group power-transfer system to the second drive-group power-transfer system. A first drive motor may operatively connect to the first drive-group power-transfer system separate of the inter-group power-transfer system. Moreover, the drive system may include a second drive motor operatively connected to the second drive-group power-transfer system separate of the inter-group power-transfer system.

22 Claims, 5 Drawing Sheets

U.S. PATENT DOCUMENTS

| | | | |
|---|---|---|---|
| 5,535,840 A | 7/1996 | Ishino et al. | |
| 5,720,358 A | 2/1998 | Christensen et al. | |
| 5,861,569 A | 1/1999 | Abels | |
| 5,915,292 A | 6/1999 | Abels | |
| 6,115,661 A | 9/2000 | Hosseini et al. | |
| 6,216,807 B1 | 4/2001 | Eckhoff | |
| 6,240,356 B1 | 5/2001 | Lapke | |
| 6,260,465 B1 | 7/2001 | Zonak et al. | |
| 6,321,865 B1 * | 11/2001 | Kuribayashi et al. | 180/243 |
| 6,358,176 B1 | 3/2002 | Nauheimer et al. | |
| 6,419,040 B2 * | 7/2002 | Kitano et al. | 180/243 |
| 6,427,797 B1 * | 8/2002 | Chang | 180/247 |
| 6,453,228 B1 * | 9/2002 | Shimada | 701/89 |
| 6,527,070 B2 | 3/2003 | Ryan | |
| 6,527,072 B1 | 3/2003 | Schlegl et al. | |
| 6,604,590 B2 | 8/2003 | Foulk, Jr. | |
| 6,615,946 B2 * | 9/2003 | Pasquini et al. | 180/248 |
| 6,640,915 B2 | 11/2003 | Haringer | |
| 6,691,806 B2 | 2/2004 | Wolfgang et al. | |
| 6,877,578 B2 * | 4/2005 | Li et al. | 180/243 |
| 6,945,347 B2 * | 9/2005 | Matsuno | 180/242 |
| 2003/0119620 A1 | 6/2003 | Zwilling et al. | |
| 2004/0069542 A1 | 4/2004 | Simmons et al. | |
| 2004/0116228 A1 | 6/2004 | Thompson | |
| 2004/0121871 A1 | 6/2004 | Thompson | |

* cited by examiner

MULTI-MOTOR DRIVE SYSTEM FOR A WORK MACHINE

TECHNICAL FIELD

The present disclosure relates to a multi-motor drive system for a work machine and, more particularly, to a multi-motor drive system with power-transfer systems that interconnect two or more of the drive motors.

BACKGROUND

Work machines, such as wheel loaders, off-highway trucks and other heavy construction and mining machines, are used to perform many tasks. To effectively perform these tasks, a work machine requires a power source such as a diesel engine, a gasoline engine, a natural gas engine, a turbine engine or any other type of power source that provides the power required to complete these tasks. Such work machines typically include a drive system that may include one or more drive motors for powering traction devices to propel the work machine.

Some work machines include a drive system with multiple, independent drive motors. Typically, each drive motor of such a drive system powers a different subset of the traction devices of the work machine. For example, some work machines include four drive motors, each of which independently powers one of four traction devices of the work machine. In some circumstances, a subset of the drive motors of such a work machine bear most or the entire burden of propelling the work machine. When traction is unevenly distributed between the traction devices, those drive motors connected to traction devices with good traction have to provide most of the power to propel the work machine.

At least one multi-motor drive system has been constructed with drive motors that supplement one another in powering the traction devices of the work machine. For example, U.S. patent application No. 2004/0121871 ("the '871 application") by Thompson, published on Jun. 28, 2004, shows a multi-motor drive system with three propulsion motors, each of which is operatively connected to and drives a wheel of the work machine. The '871 application shows three pairs of wheels spaced along the length of the work machine. One drive motor is connected to the right, front wheel, another drive motor is connected to the right, rear wheel, and another drive motor is connected to the left, rear wheel. One transmission connects the three wheels and the two drive motors on the right side of the work machine and another transmission connects the three wheels and the one drive motor on the left side of the work machine. A single cross-shaft with a differential unit connects the transmissions on the right and left of the work machine. Thus, power can transfer from each drive motor to various wheels of the work machine. A steer motor connected to the differential unit controls the speed differential between the wheels on the right and left sides of the work machine.

Although the design of the drive system of the '871 application allows sharing of drive loads between the drive motors, the design includes disadvantages. The single cross-shaft of the drive system necessitates the use of cumbersome transmission units extending along the length of the left and right sides of the work machine for transferring power from the cross shaft to the front and rear wheels. This configuration is poorly adapted for use in many work machine applications. The use of a single differential dictates that all of the wheels on the right side of the work machine rotate at the same speed and, likewise, that all of the wheels on the left side of the work machine rotate at the same speed. Additionally, the design requires the use of a steer motor to induce turning of the work machine, which increases the cost of the drive system and complicates the process of controlling the motors of the drive system.

The drive system of the present disclosure solves one or more of the problems set forth above.

SUMMARY OF THE INVENTION

One disclosed embodiment includes a multi-motor drive system. The multi-motor drive system may include a first traction device and a second traction device substantially aligned transversely of a primary travel-direction of the work machine. The drive system may further include a first drive-group power-transfer system that connects the first traction device and the second traction device. The drive system may also include a third traction device and a fourth traction device substantially aligned transversely of the primary travel-direction of the work machine. Additionally, the drive system may include a second drive-group power-transfer system that connects the third traction device and the fourth traction device. The drive system may further include an inter-group power-transfer system that connects the first drive-group power-transfer system to the second drive-group power-transfer system. The drive system may further include a first drive motor that is operatively connected to the first drive-group power-transfer system separate of the inter-group power-transfer system. Moreover, the drive system may include a second drive motor that is operatively connected to the second drive-group power-transfer system separate of the inter-group power-transfer system.

Another aspect of the present disclosure is directed to a method of operating a drive system for a work machine. The drive system includes a first drive-group with two traction devices substantially aligned transversely of a primary travel-direction of the work machine, a first drive-group power-transfer system that connects the two traction devices of the first drive-group, and a first drive motor operatively connected to the first drive-group power-transfer system. The drive system may further include a second drive-group spaced from the first drive-group in the primary travel-direction. The second drive-group may include two traction devices substantially aligned transversely of the primary travel-direction, and a second drive-group power-transfer system that connects the two traction devices of the second drive-group. The drive system may further include an inter-group power-transfer system that connects the first drive-group power-transfer system to the second drive-group power-transfer system. The method may include transferring power from the first drive motor, through at least part of the first drive-group power-transfer system, the inter-group power-transfer system, and at least part of the second drive-group power-transfer system, to at least one of the traction devices of the second drive-group.

DETAILED DESCRIPTION

Figure 1:
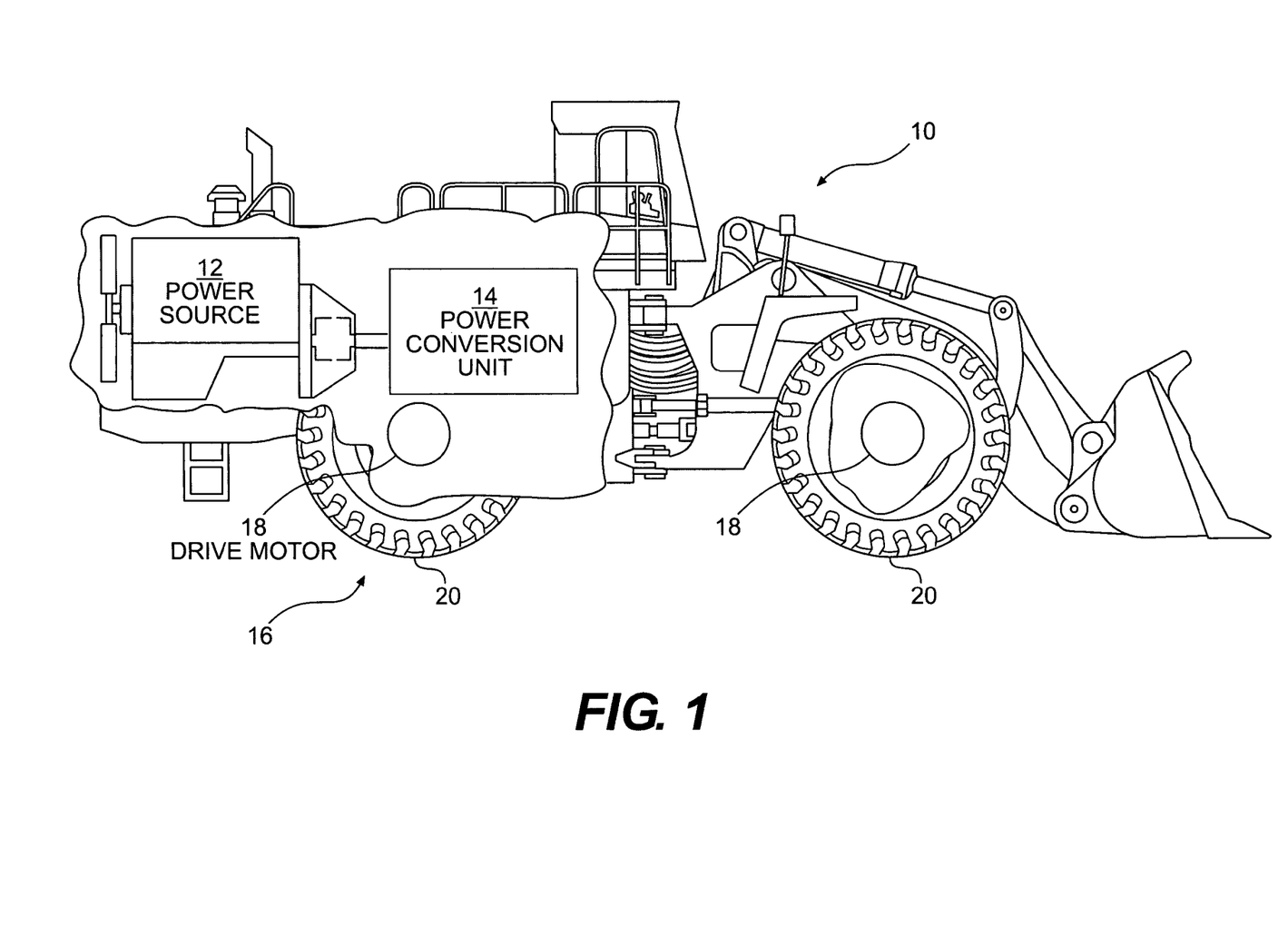
FIG. 1 is a diagrammatic illustration of a work machine in accordance with one embodiment of the present disclosure.

FIG. 1 provides a diagrammatic perspective view of a work machine 10 according to an exemplary disclosed embodiment. Work machine, as the term is used herein, refers to a mobile machine that performs some type of operation associated with a particular industry, such as mining, construction, farming, etc. and operates between or within work environments (e.g., construction site, mine site, power plants, etc.). Non-limiting examples of work machines include commercial machines, such as trucks, cranes, earth moving vehicles, mining vehicles, backhoes, material handling equipment, farming equipment, marine vessels, aircraft, and any type of movable machine that operates in a work environment.

A work machine 10 may include a power source 12, a power-conversion unit 14, a drive system 16 with multiple drive motors 18, and traction devices 20. While work machine 10 is illustrated as a wheel loader, work machine 10 may be any type of work machine 10 that includes a drive system 16 with multiple drive motors 18 for powering the traction devices 20 of the work machine 10.

Power source 12 may be any type of machine component configured to provide power to work machine 10. Power source 12 may include machine components such as a diesel engine, a gasoline engine, a natural gas engine, a turbine engine, or a fuel cell operable to generate a power output. Alternatively, power source 12 may include a power-pick-up system configured to receive electrical energy from an off-board electrical transmission system, such as a trolley system or an umbilical cord.

In one embodiment, power-conversion unit 14 is operatively coupled to power source 12. Power-conversion unit 14 may be any type of device configured for converting at least a portion of the power output supplied by power source 12 into a form useable by the drive motors 18. For instance, power-conversion unit 14 may be an electric generator that converts at least a portion of the power output of power source 12 into electrical energy. Power-conversion unit 14 may also be a hydraulic pump that converts at least a portion of the power output of power source 12 into a flow of pressurized fluid. In embodiments where power source 12 is a fuel cell or a power-pick-up system, work machine 10 may omit power-conversion unit 14.

Drive system 16 includes multiple drive motors 18 that may be operatively connected to power-conversion unit 14. In embodiments where power-conversion unit 14 is an electric generator, drive motors 18 may be electric motors powered by electrical energy from power-conversion unit 14. In embodiments where power-conversion unit 14 is a hydraulic pump, drive motors 18 may be hydraulic motors powered by a flow of pressurized fluid from power-conversion unit 14. In embodiments where power source 12 is a fuel cell or a power-pick-up system, drive motors 18 may be electric motors operatively connected directly to, and powered by electrical energy from, power source 12.

Drive system 16 also includes multiple traction devices 20 operatively coupled to drive motors 18. While traction devices 20 are illustrated as wheels, they may also be track units or any other device adapted to receive power from drive motors 18 and transfer it to the ground to propel work machine 10.

Figure 2:
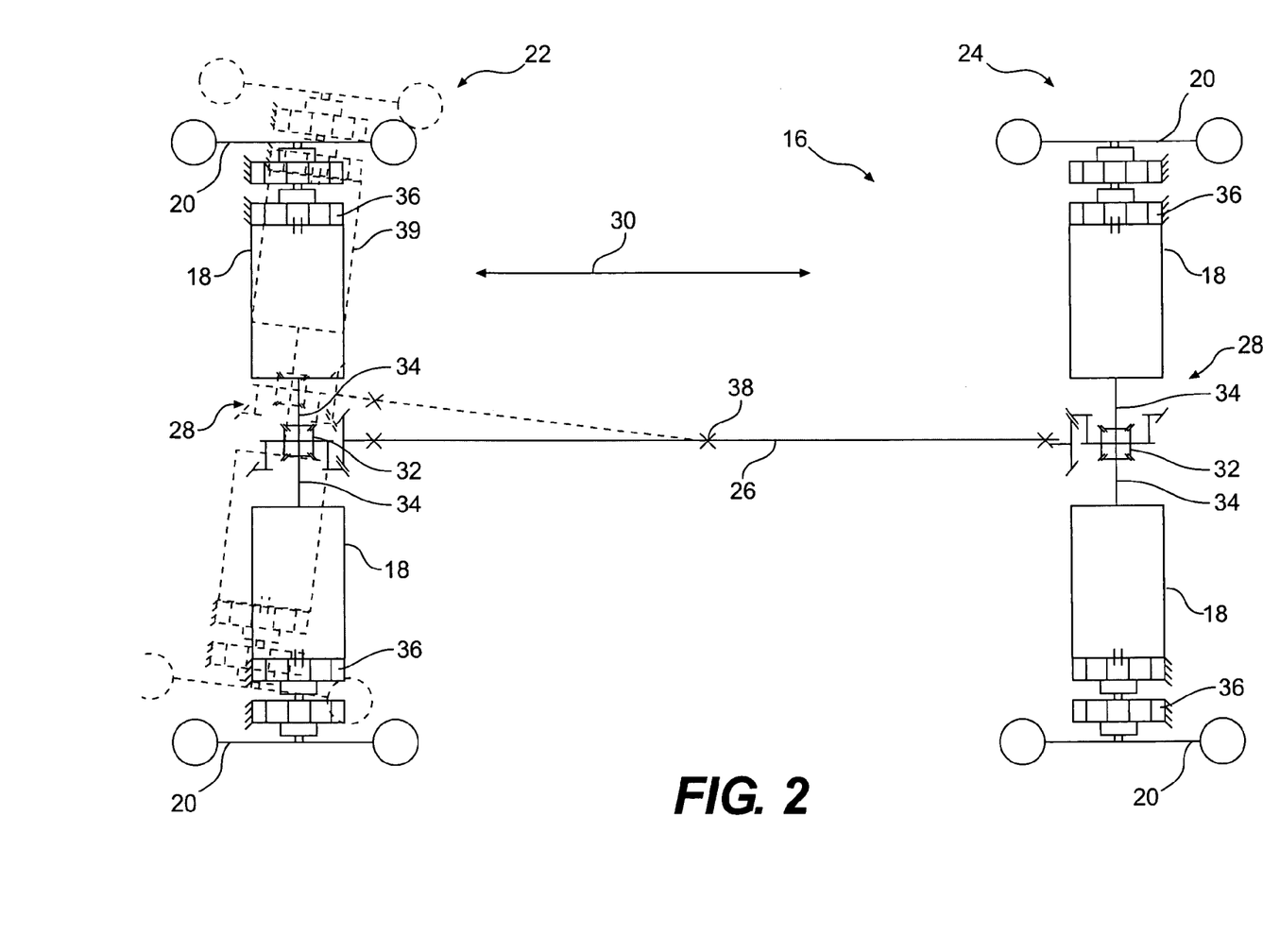
FIG. 2 is a schematic illustration of a multi-motor drive system in accordance with one embodiment of the present disclosure.

FIG. 2 shows a drive system 16 with a first drive-group 22 and a second drive-group 24 consistent with certain disclosed embodiments. Drive system 16 may include an inter-group power-transfer system 26 that connects first and second drive-groups 22, 24.

In one embodiment, drive-groups 22, 24 of drive system 16 may include two traction devices 20, a drive-group power-transfer system 28, and two drive motors 18. Drive-groups 22, 24 may be spaced apart in a primary travel-direction 30 of the work machine 10. Traction devices 20 of each drive-group 22, 24 are substantially aligned transversely of the primary travel-direction 30 of the work machine 10.

Each drive-group power-transfer system 28 mechanically connects traction devices 20 of a respective drive group 22, 24. Further, each drive-group power-transfer system 28 of the embodiment shown in FIG. 2 includes a differential unit 32, two drive shafts 34, two drive motors 18, and two motion-conversion units 36 connected in series between traction devices 20.

Although FIG. 2 shows drive motors 18 connected in series with other components of drive-group power-transfer systems 28 between traction devices 20 of respective drive-groups 22, 24, other embodiments may implement alternative configurations. For instance, a drive motor 18 may be disposed adjacent a drive-group power-transfer system 28 and operatively connected to the drive-group power-transfer system 28 through gears, chains, belts, or other power-transfer components. Further, a drive motor 18 may connect to a drive-group power-transfer system 28 through a traction device 20 connected to the drive-group power-transfer system 28. Additionally, embodiments may implement drive-groups 22, 24 that include more or less than two drive motors 18.

Drive-group power-transfer system 28 is not limited to the configuration shown in FIG. 2. For example, drive-group power-transfer system 28 may omit one or both of motion-conversion units 36 shown in FIG. 2, one or both of drive shafts 34, and/or differential unit 32. Also, whereas FIG. 2 shows the components of each drive-group power-transfer system 28 aligned on a common axis, no particular spatial arrangement is required by the disclosed embodiments.

Further, drive-group power-transfer system 28 may also be implemented with different types of components. For instance, differential unit 32 may be any type of differential unit 32 that mechanically connects traction devices 20 of drive-group 22 or 24, while allowing independent rotation between those traction devices 20. Drive-group power-transfer system 28 may also implement various gears, chains, belts, flexible joints and other power-transfer components in addition to or in place of drive shafts 34.

Inter-group power-transfer system 26 mechanically connects first drive-group 22 with second drive-group 24. In one embodiment, inter-group power-transfer system 26 may be a drive shaft that connects to drive-group power-transfer systems 28 of first and second drive-groups 22, 24 through their respective differential units 32. In other embodiments, inter-group power-transfer system 26 may connect first and second drive-groups 22, 24 in other manners that enable power transfer between drive-groups 22 and 24. For example, inter-group power-transfer system 26 may connect to a different portion of drive-group power-transfer system 28 or to traction device 20 of a respective drive-group 22, 24. Additionally, inter-group power-transfer system 26 may include other types of power-transfer components such as gears, sprockets, belts, chains, and flexible couplings in addition to or place of a drive shaft.

Drive system 16 is not limited to the configuration shown in FIG. 2. For example, drive system 16 may include one or more other drive-group(s) in addition to first and second drive-groups 22, 24. Moreover, drive system 16 may include one or more other inter-group power-transfer system(s) in addition to inter-group power-transfer system 26. Such additional inter-group power-transfer systems may connect any additional drive-groups to one another and/or to drive-group 22 and/or drive-group 24.

Additionally, in one embodiment, traction devices 20 of first drive-group 22 and traction devices 20 of second drive-group 24 may be pivotally steerable relative to one another. For instance, drive system 16 may be configured such that first drive-group 22 pivots relative to second drive-group 22 about a central pivot point 38. FIG. 2 illustrates drive system 16 with first drive-group 22 pivoting relative to second drive-group 24 in dashed lines 39.

Figure 3:
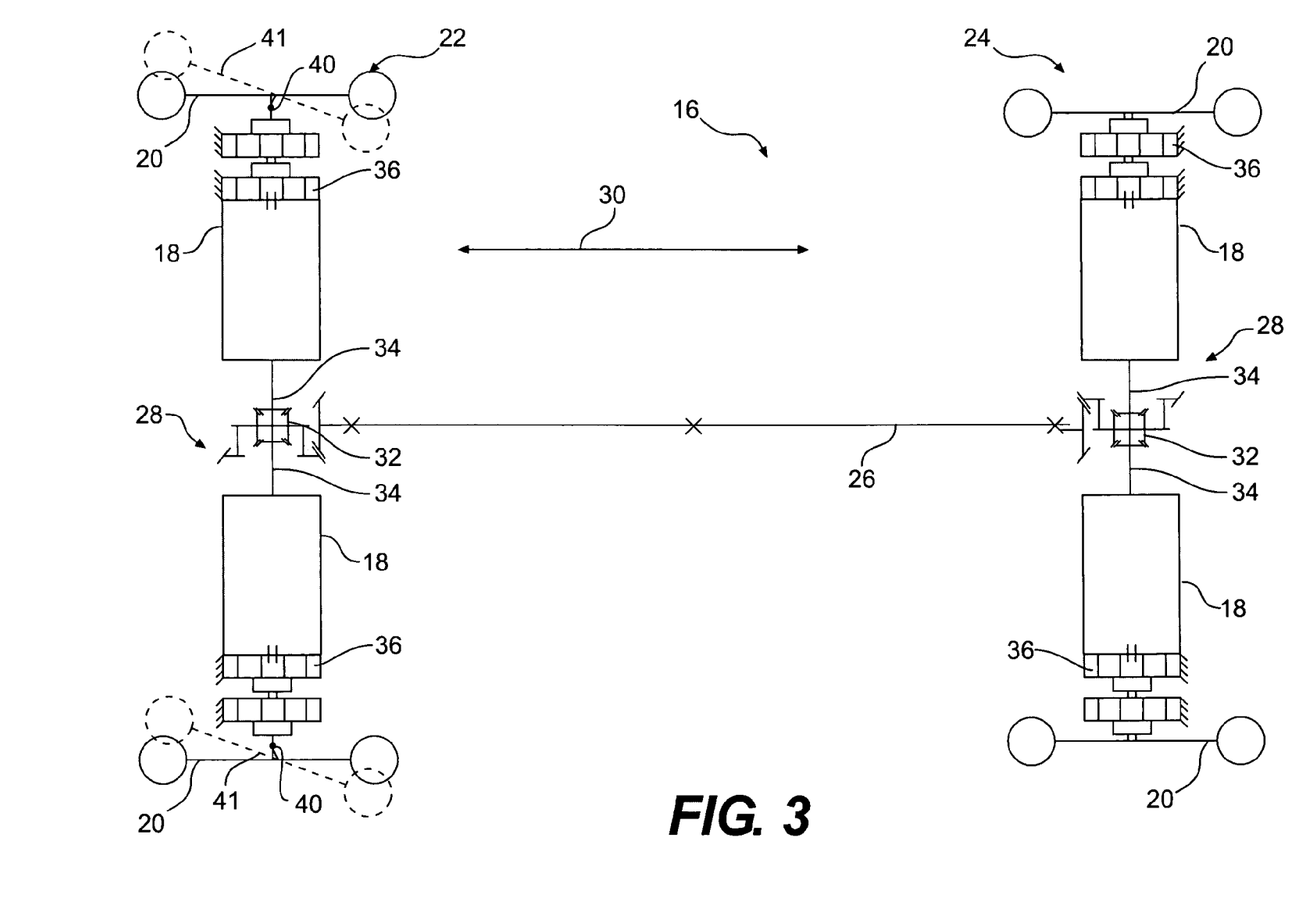
FIG. 3 is a schematic illustration of a multi-motor drive system in accordance with one embodiment of the present disclosure.

In another embodiment, first and second drive-groups 22, 24 may not be pivotal relative to one another. Instead, traction devices 20 of a drive-group may be pivotally steerable about respective steering pivot points. FIG. 3 shows a drive system 16 consistent with this embodiment. As shown, traction devices 20 of first drive-group 22 are pivotally steerable about steering pivot points 40. FIG. 3 illustrates drive system 16 with traction devices 20 of first drive-group 22 pivoted in dashed lines 41.

Figure 4:
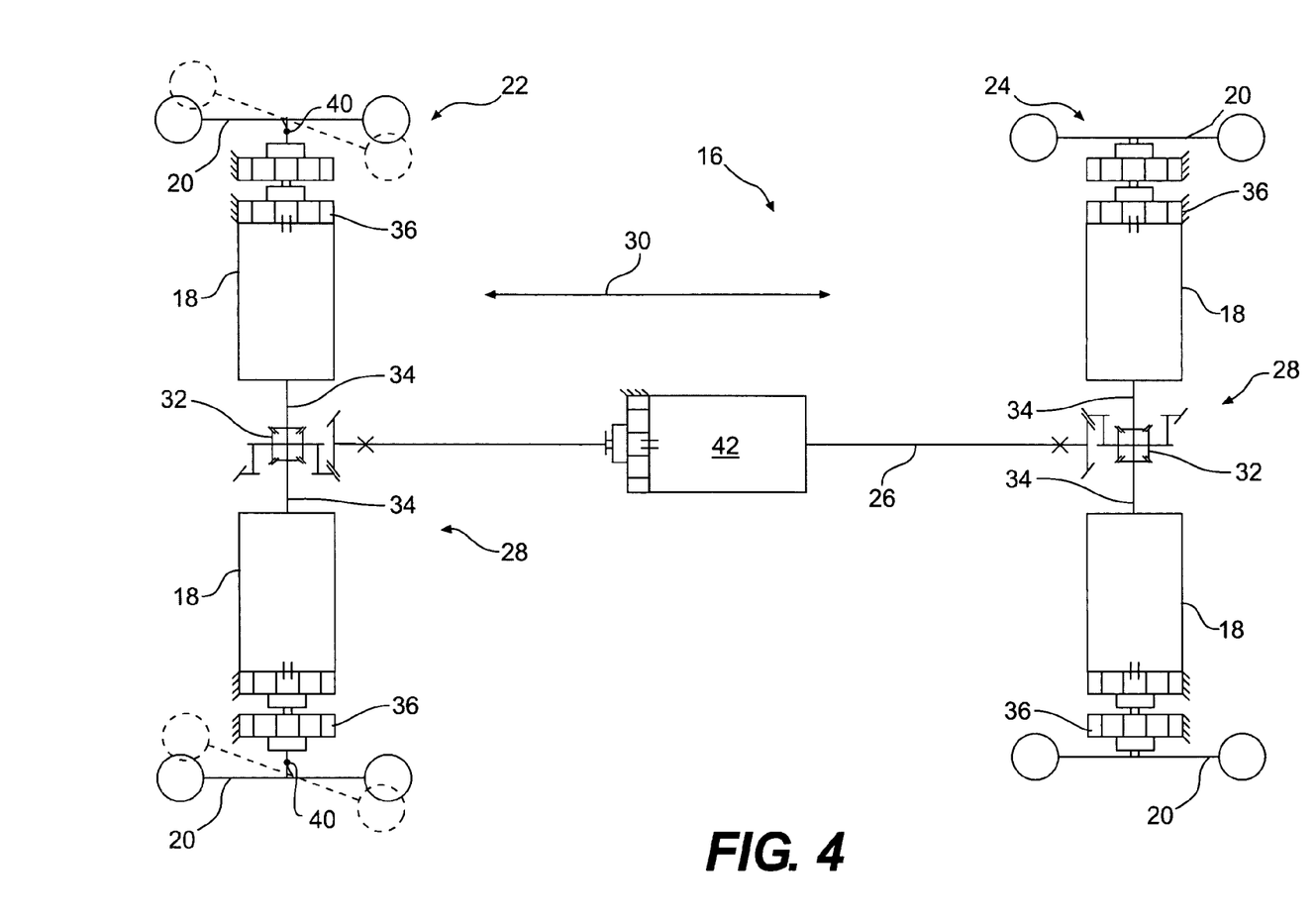
FIG. 4 is a schematic illustration of a multi-motor drive system in accordance with one embodiment of the present disclosure.

Consistent with another embodiment, FIG. 4 shows drive system 16 illustrated in FIG. 3 including an inter-group drive motor 42 connected to inter-group power-transfer system 26. A motion-conversion unit 36 and a drive shaft connect one end of inter-group drive motor 42 to drive-group power-transfer system 28 of first drive-group 22. Further, a drive shaft may connect the other end of inter-group drive motor 42 to drive-group power-transfer system 28 of second drive-group 24. Inter-group drive motor 42 may be connected to inter-group power-transfer system 26 in any manner allowing the transfer of power through inter-group power-transfer system 26 to first and second drive-groups 22, 24. Drive system 16 is not limited to the configuration shown in FIG. 4. For example, drive system 16 may include multiple inter-group drive motors 42 operatively connected to inter-group power-transfer system 26.

Figure 5:
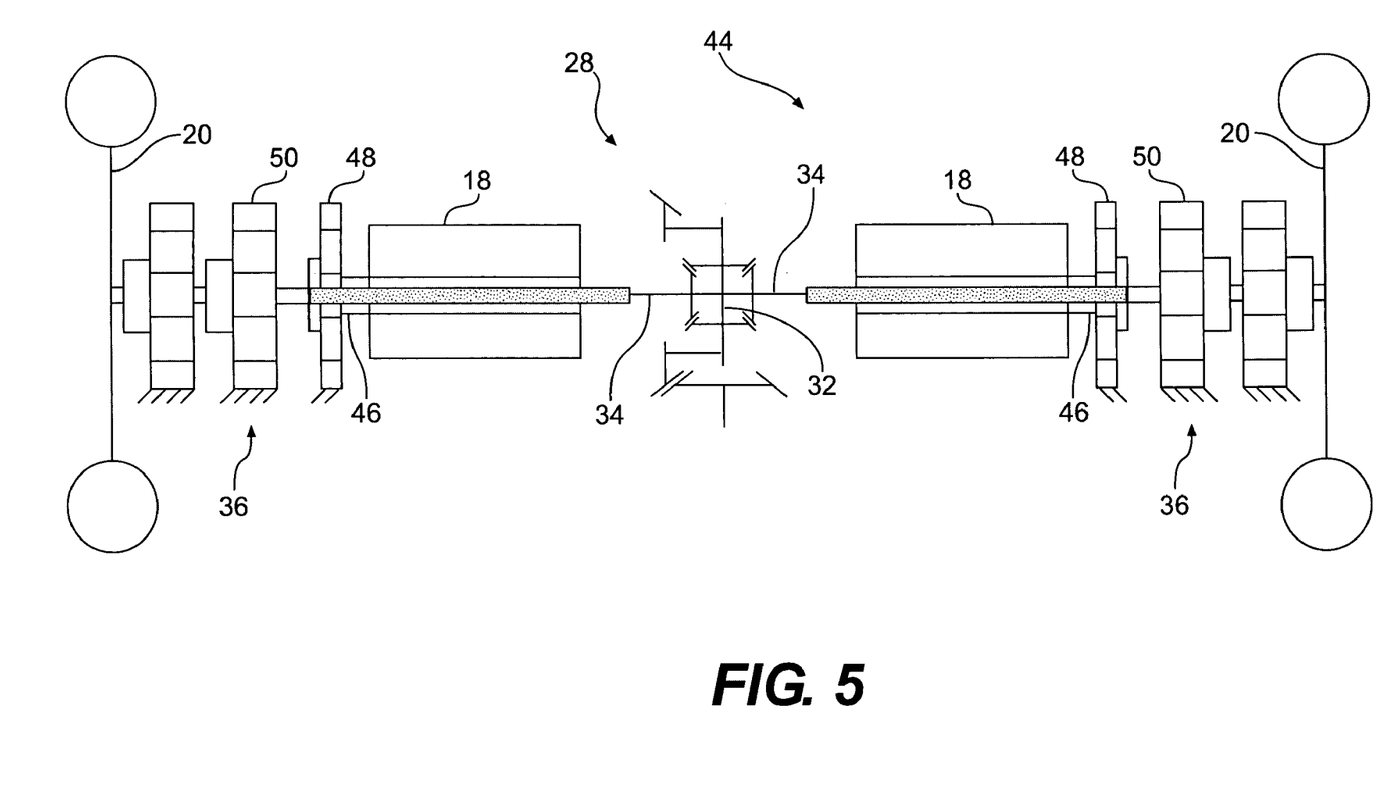
FIG. 5 is a schematic illustration of a drive-group for a multi-motor drive system in accordance with one embodiment of the present disclosure.

FIG. 5 illustrates an alternative configuration of a drive-group 44 for an exemplary drive system 16. Drive-group 44 may be similar to any one of first and second drive-groups 22, 24 shown in FIG. 2. In the embodiment of FIG. 5, however, each drive motor 18 may connect to a respective drive shaft 34 indirectly, through components of an associated motion-conversion unit 36. An output shaft 46 of each drive motor 18 may be hollow, and each drive shaft 34 may extend through a respective output shaft 46. Each motion-conversion unit 36 may include a first-stage planetary gear set 48 with a hollow sun gear. Each drive shaft 34 may extend through the hollow sun gear of a respective first-stage planetary gear set 48. Additionally, each motion-conversion unit 36 may include a second-stage planetary gear set 50. An outboard end of each drive shaft 34 may connect to a sun gear of a respective second-stage planetary gear set 50. Each first-stage planetary gear set 48 may connect an outboard end of a respective output shaft 46 to the sun gear of a respective second-stage planetary gear set 48 and, thus, to a respective drive shaft 34.

The construction of drive-group 44 is not limited to that shown in FIG. 5. For instance, the components of drive-group 44 may be arranged such that drive shaft 34 need not pass through drive motor 18. Additionally, drive shaft 34 may be connected to an output shaft 46 of a drive motor 18 through more than one stage of motion conversion components.

INDUSTRIAL APPLICABILITY

Drive system 16 of the disclosed embodiments has potential application in any work machine 10 having multiple drive motors 18 and traction devices 20. The operation of a work machine 10 with a drive system 16 consistent with these embodiments is described below with reference to FIGS. 2 and 5.

In one embodiment, during operation of work machine 10, power source 12 generates and transmits a power output to power-conversion unit 14. In turn, power-conversion unit 14 converts power output from the power source 12 into a form useable by drive motors 18. In embodiments where power-conversion unit 14 is an electric generator, power-conversion unit 14 converts the power output from power source 12 into electrical energy. In embodiments where power-conversion unit 14 is a hydraulic pump, power-conversion unit 14 converts the power output from power source 12 into a flow of pressurized fluid.

Drive motors 18 receive power from power-conversion unit 14 and power traction devices 20. In embodiments where a drive motor 18 is an electric motor, the motor 18 may receive electrical energy from power-conversion unit 14. In embodiments where a drive motor 18 is a hydraulic motor, the motor 18 may receive a flow of pressurized fluid from power-conversion unit 14. Drive motors 18 of first drive-group 22 transmit power to traction devices 20 of first drive-group 22, which transmit that power to the ground. Likewise, drive motors 18 of second drive-group 24 provide power to traction devices 20 of second drive-group 24 to transmit power to the ground.

In certain embodiments, power from drive motors 18 may be transferred between first and second drive-groups 22, 24. This may occur, for example, when traction devices 20 of first drive-group 22 have more traction than traction devices 20 of second drive-group 24. Under such circumstances, drive motors 18 of second drive-group 24 may not transfer power to the ground through traction devices 20 of second drive-group 24. Drive motors 18 of second drive-group 24, however, transfer power through inter-group power-transfer system 26 to traction devices 20 of first drive-group 24. Thus, embodiments with inter-group power-transfer system 26 connecting drive-groups 22 and 24 enable drive system 16 to convert the full power capacity of drive motors 18 into tractive effort, despite traction devices 20 of second drive-group 24 having poor traction.

Because drive-groups 22, 24 each include a drive-group power-transfer system 28, a single inter-group power-transfer unit 26 enables the fore-and-aft transfer of power to all traction devices 20 of work machine 10. Additionally, inter-group power-transfer unit 26 may be positioned anywhere within the width of work machine 10. These attributes of drive system 16 make it well-suited for use in many different work machine applications. For example, this embodiment is particularly beneficial in applications like that of FIG. 2 where drive-groups 22, 24 are pivotal relative to one another. In such applications, single inter-group power-transfer system 26 may extend through, and pivot about, central pivot point 38. This allows inter-group power-transfer unit 26 to maintain a constant length during pivoting of drive-groups 22, 24 relative to one another.

The ability to transfer power between first and second drive-groups 22, 24 is particularly beneficial in applications where the weight of work machine 10 frequently shifts between traction devices 20 of first drive-group 22 and traction devices 20 of second drive-group 24. For example, in the case of a wheel loader, the machine weight frequently shifts from being evenly distributed between traction devices 20 to being entirely on traction devices 20 of first or second drive-group 22, 24.

Additionally, drive motors 18 may operate according to traction-control and/or stability control algorithms to further enhance the performance of work machine 10. For example, work machine 10 may include control units that execute software programs that analyze sensor inputs reflecting one or more parameters of work machine 10. Based on the analysis, the control units may independently control one or more of drive motors 18 to prevent slippage of traction devices 20 and/or erratic movement of work machine 10. In such embodiments, work machine 10 may implement various types of traction-control and/or stability control algorithms to ensure proper traction during operation.

Certain embodiments of drive system 16 are particularly well adapted to execution of traction-control and/or stability control algorithms because they allow a great deal of flexibility in controlling the motion of respective traction devices 20. For instance, drive systems 16 with a differential unit 32 in each drive-group 22, 24 allow a first speed differential between traction devices 20 of first drive-group 22 and a second speed differential, which may have a different magnitude than the first speed differential, between traction devices 20 of second drive-group 24. For example, one traction device 20 of first drive-group 22 may rotate at 12 RPM while the other traction device 20 of first drive-group 22 rotates at 14 RPM, in which case, the magnitude of the speed differential between the traction devices 20 of first drive-group 22 would be 2 RPM. Simultaneously, one traction device 20 of second drive-group 24 may rotate at 11 RPM while the other traction device 20 of second drive-group 24 rotates at 15 RPM, in which case the magnitude of the speed differential between the traction devices 20 of second drive-group 24 would be 4 RPM.

Moreover, drive systems 16 with pivotally steerable traction devices 20 preclude the need for drive motors 18 to induce steering of work machine 10. This simplifies controlling drive motors 18 and reduces the cost of drive system 16. Additionally, drive systems 16 with differential units 32 in both first drive-group 22 and second drive-group 24 are particularly well adapted for steering of work machine 10 by pivoting traction devices 20. Such configurations allow traction devices 20 of first drive-group 22 to have a higher or lower speed differential than traction devices 20 of second drive-group 24, which accommodates different traction devices 20 traveling different arcs when pivoted to induce turning of work machine 10.

Further, drive systems 16 consistent with the disclosed embodiments offer high power capacity relative to their physical size. In particular, drive systems 16 with an inter-group drive motor 42 efficiently utilize the available space on work machine 10 to provide high power capacity for propelling work machine 10 over different types of terrains.

The disclosed embodiments of drive system 16 also accommodate use of drive motors 18 and components of a drive-group power-transfer system 28 with different optimal operating conditions. For example, connecting components of a drive-group power-transfer system 28 to a drive-motor 18 through one or more stages of a motion-conversion unit 36, as shown in FIG. 5, may facilitate optimal operating conditions for both drive motor 18 and the components of drive-group power-transfer system 28. In particular, connecting a drive shaft of a drive-group power-transfer system 28 to a drive motor 18 through one or more stages of speed reduction allows operation of the drive motor 18 at high motor speeds and the drive shaft 34 at low shaft speeds.

It will be apparent to those skilled in the art that various modifications and variations can be made in the disclosed drive systems without departing from the scope of the disclosure. Other embodiments of the disclosed drive systems will be apparent to those skilled in the art from consideration of the specification and practice of the drive systems disclosed herein. It is intended that the specification and examples be considered as exemplary only, with a true scope of the disclosure being indicated by the following claims and their equivalents.

What is claimed is:

1. A multi-motor drive system for a machine, comprising:
   a first traction device and a second traction device substantially aligned transversely of a primary travel-direction of the machine;
   a first drive-group power-transfer system that connects the first traction device and the second traction device;
   a third traction device and a fourth traction device substantially aligned transversely of the primary travel-direction of the machine;
   a second drive-group power-transfer system that connects the third traction device and the fourth traction device;
   an inter-group power-transfer system that connects the first drive-group power-transfer system to the second drive-group power-transfer system and is configured to permit transfer of power between the first drive-group power-transfer system and the second drive-group power-transfer system;
   a first drive motor operatively connected to the first drive-group power-transfer system separate from the inter-group power-transfer system, the first drive-group power-transfer system includes a motion-conversion unit and a drive shaft, and an output shaft of the first drive motor connects to the drive shaft through components of the motion-conversion unit; and
   a second drive motor operatively connected to the second drive-group power-transfer system separate from the inter-group power-transfer system.

2. The multi-motor drive system of claim 1, wherein the first drive-group power-transfer system includes a first differential unit and the second drive-group power-transfer system includes a second differential unit.

3. The multi-motor drive system of claim 2, wherein the inter-group power-transfer system connects to the first drive-group power-transfer system through the first differential unit and the inter-group power-transfer system connects to the second drive-group power-transfer system through the second differential unit.

4. The multi-motor drive system of claim 3, wherein the first traction device and the second traction device are pivotally steerable relative to the third traction device and the fourth traction device.

5. The multi-motor drive system of claim 2, further including:
   a third drive motor operatively connected to the first drive-group power-transfer system separate from the inter-group power-transfer system and at a point such that the first differential unit is connected between the first drive motor and the third drive motor; and
   a fourth drive motor operatively connected to the second drive-group power-transfer system separate from the inter-group power-transfer system and at a point such that the second differential unit is connected between the second drive motor and the fourth drive motor.

6. The multi-motor drive system of claim 1, wherein the first traction device and the second traction device are pivotally steerable relative to the third traction device and the fourth traction device.

7. The multi-motor drive system of claim 1, further including:

an inter-group drive motor operatively connected to the inter-group power-transfer system.

8. A method of operating a drive system for a machine, the drive system having a first drive-group with two traction devices substantially aligned transversely of a primary travel-direction of the machine, a first drive-group power-transfer system that connects the two traction devices of the first drive-group, and a first drive motor operatively connected to the first drive-group power-transfer system, the drive system having a second drive-group spaced from the first drive-group in the primary travel-direction and including two traction devices substantially aligned transversely of the primary travel-direction and a second drive-group power-transfer system that connects the two traction devices of the second drive-group, and the drive system having an inter-group power-transfer system that connects the first drive-group power-transfer system to the second drive-group power-transfer system, the method including:

transferring power from the first drive motor, through at least part of the first drive-group power-transfer system, the inter-group power-transfer system, and at least part of the second drive-group power-transfer system, to at least one of the traction devices of the second drive-group.

9. The method of claim 8, further including:
accommodating a first speed differential between the traction devices of the first drive-group; and
accommodating a second speed differential between the traction devices of the second drive-group, wherein the second speed differential has a different magnitude than the first speed differential.

10. The method of claim 9, further including:
pivoting the traction devices of at least one of the first drive-group and the second drive-group to induce turning of the machine relative to the primary-travel direction.

11. The method of claim 10, further including:
transferring power from a second drive motor to the second drive-group power-transfer system separately from the inter-group power-transfer system.

12. The method of claim 9, wherein the first drive-group power-transfer system includes a first differential unit that accommodates the first speed differential and the second drive-group power-transfer system includes a second differential unit that accommodates the second speed differential.

13. The method of claim 9, further including:
transferring power from a second drive motor to the second drive-group power-transfer system separately from the inter-group power-transfer system.

14. The method of claim 9, further including:
transferring power from a second drive motor to the second drive-group power-transfer system separately from the inter-group power-transfer system.

15. The method of claim 14, further including:
transferring power from a third drive motor, through at least part of the first drive-group power-transfer system, the inter-group power-transfer system, and at least part of the second drive-group power-transfer system, to at least one of the traction devices of the second drive-group; and
transferring power from a fourth drive motor to the second drive-group power-transfer system separately from the inter-group power-transfer system.

16. The method of claim 8, further including:
transferring power from an inter-group drive motor, through at least part of the inter-group power-transfer system and at least part of the second drive-group power-transfer system, to at least one of the traction devices of the second drive-group.

17. The method of claim 8, further including:
pivoting the traction devices of at least one of the first drive-group and the second drive-group to induce turning of the machine relative to the primary travel-direction.

18. A machine, comprising:
a power source;
a power-conversion unit operatively coupled to the power source;
a first traction device and a second traction device substantially aligned transversely of a primary travel-direction of the machine;
a first drive-group power-transfer system, including a first differential unit, that connects the first traction device and the second traction device;
a third traction device and a fourth traction device substantially aligned transversely of the primary travel-direction of the machine;
a second drive-group power-transfer system, including a second differential unit, that connects the third traction device and the fourth traction device;
an inter-group power-transfer system that connects the first drive-group power-transfer system to the second drive-group power-transfer system;
a first drive motor operatively connected to the first drive-group power-transfer system separate from the inter-group power-transfer system;
a second drive motor operatively connected to the first drive-group power-transfer system separate from the inter-group power-transfer system and at a point such that the first differential unit is connected between the first drive motor and the second drive motor;
a third drive motor operatively connected to the second drive-group power-transfer system separate from the inter-group power-transfer system; and
a fourth drive motor operatively connected to the second drive-group power-transfer system separate from the inter-group power-transfer system and at a point such that the second differential unit is connected between the third drive motor and the fourth drive motor.

19. The machine of claim 18, wherein the inter-group power-transfer system connects to the first drive-group power-transfer system through the first differential unit and the inter-group power-transfer system connects to the second drive-group power-transfer system through the second differential unit.

20. The machine of claim 19, wherein the first traction device and the second traction device are pivotally steerable relative to the third traction device and the fourth traction device.

21. The machine of claim 18, wherein the first traction device and the second traction device are pivotally steerable relative to the third traction device and the fourth traction device.

22. The machine of claim 18, further including:
an inter-group drive motor operatively connected to the inter-group power-transfer system.

* * * * *